(12) United States Patent
Nogayama et al.

(10) Patent No.: US 12,547,428 B2
(45) Date of Patent: Feb. 10, 2026

(54) PAGE TRANSITION DETECTION USING SCREEN OPERATION HISTORY

(71) Applicant: INTERNATIONAL BUSINESS MACHINES CORPORATION, Armonk, NY (US)

(72) Inventors: Takahide Nogayama, Kawasaki (JP); Akihiko Tozawa, Minato-ku (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 806 days.

(21) Appl. No.: 17/550,766

(22) Filed: Dec. 14, 2021

(65) Prior Publication Data

US 2023/0185582 A1 Jun. 15, 2023

(51) Int. Cl.
*G06F 9/451* (2018.01)
*G06F 9/455* (2018.01)
*G06V 10/762* (2022.01)

(52) U.S. Cl.
CPC ............ *G06F 9/451* (2018.02); *G06V 10/762* (2022.01); *G06F 9/45512* (2013.01)

(58) Field of Classification Search
CPC .......... G06F 9/445; G06F 16/35; G06F 16/45; G06F 16/55; G06F 16/75; G06F 16/906
See application file for complete search history.

(56) References Cited

U.S. PATENT DOCUMENTS

| | | | | |
|---|---|---|---|---|
| 5,996,011 A * | 11/1999 | Humes | .................. | H04L 63/102 726/13 |
| 6,836,780 B1 * | 12/2004 | Opitz | ..................... | G06F 9/451 707/999.102 |
| 8,868,993 B1 | 10/2014 | Yu et al. | | |
| 9,311,425 B2 | 4/2016 | Mahan et al. | | |
| 9,767,213 B2 | 9/2017 | Jeong | | |
| 10,108,695 B1 | 10/2018 | Yeturu et al. | | |
| 2007/0065040 A1 * | 3/2007 | Ming | .................... | G06T 3/4038 382/284 |
| 2014/0111522 A1 | 4/2014 | Refstrup et al. | | |

FOREIGN PATENT DOCUMENTS

| | | | |
|---|---|---|---|
| CN | 102693304 A | 9/2012 | |
| JP | 2016038693 A | 3/2016 | |
| WO | WO-2017123203 A1 * | 7/2017 | .......... G06F 11/3664 |
| WO | 2023/109359 A1 | 6/2023 | |

OTHER PUBLICATIONS

Countwordsfree, Compare Text Online, Oct. 31, 2020, CountwordsFree from Internet Archive Wayback Machine (Year: 2020).*
International Search Report issued in corresponding PCT Application Serial No. PCT/CN2022/130272 dated Jan. 20, 2023, 4 pgs.

* cited by examiner

*Primary Examiner* — Aimee Li
*Assistant Examiner* — Harrison Li
(74) *Attorney, Agent, or Firm* — Tutunjian & Bitetto, P.C.; Robert Richard Aragona

(57) ABSTRACT

Automation methods and systems include identifying common parts of consecutive pairs of consecutive screen outputs. The consecutive screen outputs are clustered responsive to a determination that a distance between the common parts of the consecutive pairs is lower than a threshold distance value. Interactions with a remote computer system are automated based on the clustered consecutive screen outputs.

20 Claims, 10 Drawing Sheets

PAGE TRANSITION DETECTION USING SCREEN OPERATION HISTORY

BACKGROUND

The present invention generally relates to automation scripting, and more particularly, to automation scripting for communications over a screen-based terminal protocol.

Screen-based terminal protocols may transmit an entire screen of information at once, without providing any information to the recipient about the context or other functional information relating to the contents of the screen. Such terminal protocols are often used in legacy systems, making it difficult to interface with them using modern technologies and techniques.

SUMMARY

An automation method includes identifying common parts of consecutive pairs of consecutive screen outputs. The consecutive screen outputs are clustered responsive to a determination that a distance between the common parts of the consecutive pairs is lower than a threshold distance value. Interactions with a remote computer system are automated based on the clustered consecutive screen outputs.

An automation system includes a hardware processor and a memory that stores a computer program. When executed by the hardware processor, the computer program causes the hardware processor to identify common parts of consecutive pairs of consecutive screen outputs, to cluster the consecutive screen outputs responsive to a determination that a distance between the common parts of the consecutive pairs is lower than a threshold distance value, and to automate interactions with a remote computer system based on the clustered consecutive screen outputs.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Mainframe terminal protocols, such as the 3270 mainframe terminal protocol, may communicate with a data stream that intersperses text and control data, such that an entire screen may be transmitted at once for display on the terminal. The text representation of the screen is transferred from the mainframe to the client, but the client does not know how the screen relates to the underlying program. To automate operations on the mainframe, scripts may be used by the client that reproduce a key sequence in the terminal protocol. To assist in generating such a script, key events and corresponding screens can be extracted to identify reusable/repeatable actions.

A script may be implemented as a sequence of keyboard events that correspond to a given screen. However, the reusability of scripts is hampered by the screen-based communications of the protocol, as it is difficult to map events to particular pages. One approach to the problem would be to assume that the keyboard events that correspond to similar screens map to the same page of an application. However, screens generated from the same page may have significantly different text representations. This approach may incorrectly map such screens to different pages on the basis of the differences in the displayed text.

Once example of such a situation would be a "table viewer" page that has a list of entries too long to display on the screen at once. As the user pages down through the list, most of the information on the screen may change, leading a purely similarity-based approach to erroneously conclude that the screens related to different pages, rather than a single table viewer page. Thus, such an approach will identify certain screens as being linked to a single page, but may miss other connections.

To improve the results of such a screen clustering approach, clusters may then be merged together on the basis of pattern matching. This process may, for example, identify the common parts of a first pair of consecutive screens and compare them to the common parts of a second pair of consecutive screens. If the differences between the common parts of the respective pairs is small, then the clusters of the screens may be merged together.

Figure 1:
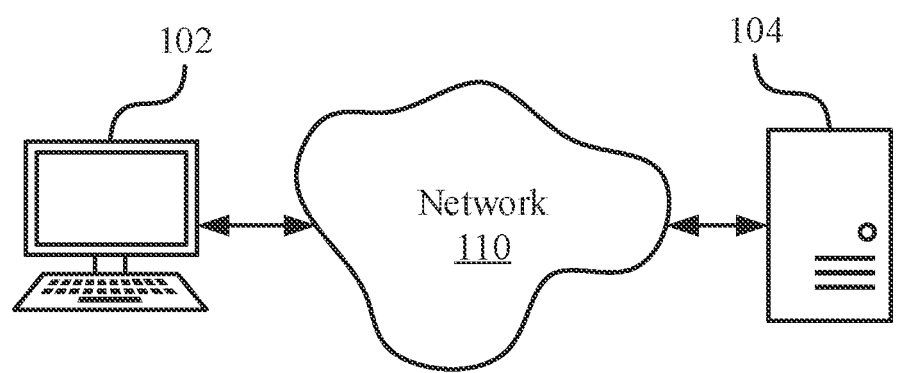
FIG. 1 is a diagram of a networked computer system, where a client communicates with a remote computing device, in accordance with an embodiment of the present invention.

Referring now to FIG. 1, a diagram of communications between a mainframe and a client terminal are shown. The client 102 communicates with the mainframe 104 via a network 110. In some cases, the client 102 may include a dedicated hardware terminal, while in other cases the client may include software terminal emulation or a web interface that communicate via the same protocol, but without the dedicated hardware terminal.

It is specifically contemplated herein that the communications between the client 102 and the mainframe 104 may use a screen-based terminal protocol, such as the IBM® 3270 terminal protocol. Originally designed to provide access to multiple clients 102 for a single mainframe 104, the 3270 protocol minimizes the amount of data that is transmitted and the frequency at which data needs to be transmitted. As a result, the client 102 may only transmit data to the mainframe 104 when a full input is entered, and the mainframe 104 may transmit an entire screen's worth of information at once in response to such an input.

The information for a single screen may be divided into fields, for which character attributes can be respectively set. The client 102 can use this information to display the screen's information, which a user may interact with via, e.g., a keyboard or other input device. Any values that have been changed may then be transmitted back to the mainframe 104, and a new screen may be sent back to the client 102. In this manner, a user can interact with the mainframe 104 from a remote location.

Due to the legacy nature of many mainframe installations, and further due to the mission-critical functions that such mainframes may perform, older communications protocols, such as the 3270 protocol are still in common use. However, the text-only nature of the protocol may make manual control of the mainframe 104 through such a protocol particularly tedious for the user. Scripts may therefore be used to automate tasks.

Similarly, the present principles may be applied to scripting interactions with websites, which operate by similar principles. For example, a client 102 may interact with a webserver to load a single-page application. In this case, an HTTP GET operation may be performed to load the program, after which all operations are done on the page. As an analogy to the example described above, the web browser may represent the client 102, and the single-page application may represent the mainframe 104. A client's actions (e.g., keyboard inputs and mouse actions) and the displayed screen can be observed, but the inner workings of the application may not be discoverable. In such an example, the present principles may be used to identify screens displayed by the single-page application that are related to a corresponding page.

In another example, the present principles may be extended to any application or software program where the inner workings of the program are opaque to the user. For example, a program may respond to a user's input with a full screen output, whether text or graphics, and it may be difficult to determine when screens generated by the program are related to one another on the basis of a simple similarity metric.

Furthermore, although the present embodiments are described in the context of textual screen-based communications, the present principles are not limited to textual information. Screen information may include graphical components that represent some or all of the information of the screen. The similarity of such graphical components may be considered, just as the similarity of textual components are considered.

Figure 2:
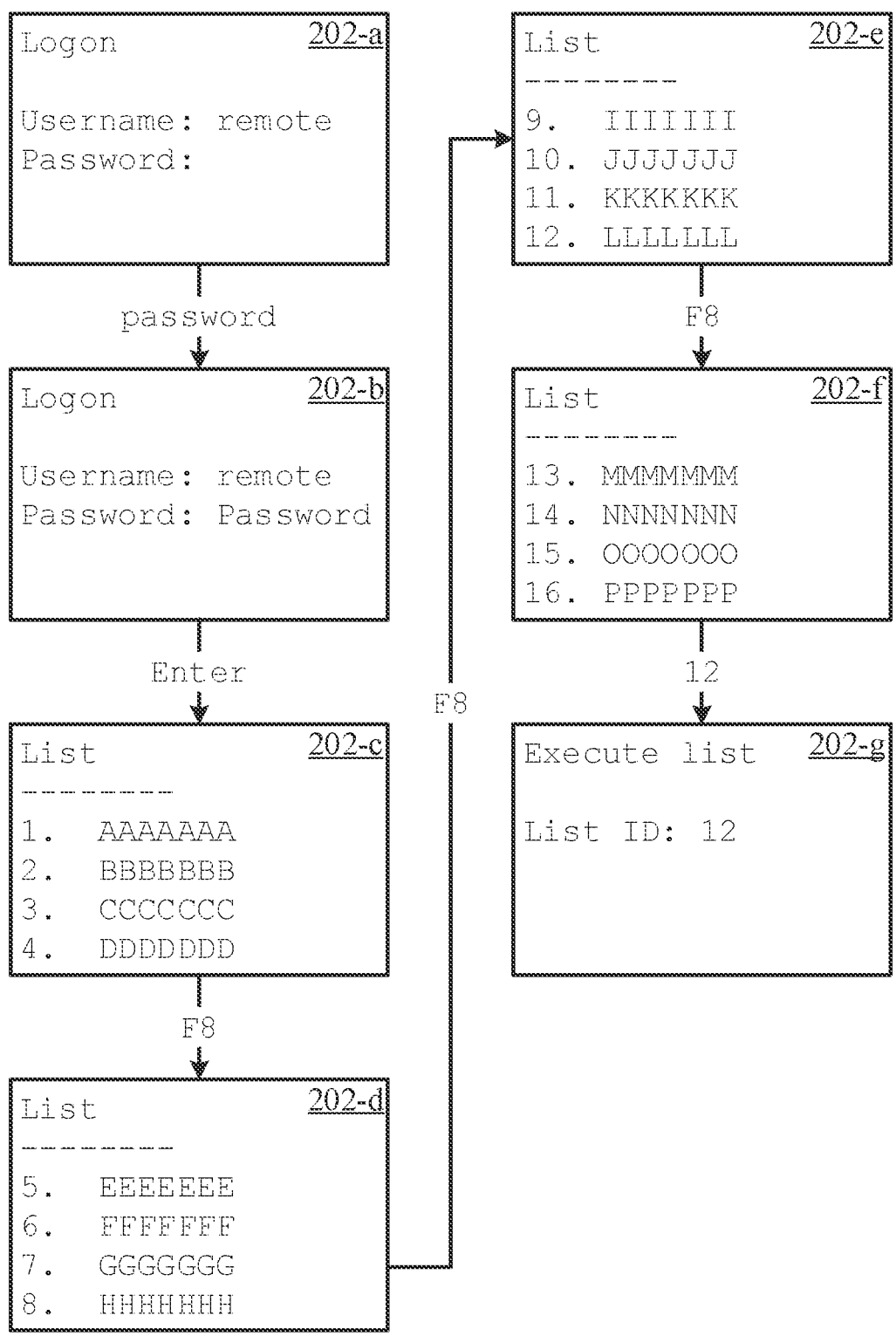
FIG. 2 is a diagram illustrating a series of exemplary screen outputs in an interaction between a client system and a remote system, in accordance with an embodiment of the present invention.

Referring now to FIG. 2, a series of screens 202-a to 202-g is shown. To make the difference between reference numbers and the contents of the screens 202 more clear, the contents of the screens 202 are shown using a fixed width font. Starting at screen 202-a, each subsequent screen is provided in response to some input by a user.

Some of the screens 202 are related to one another. For example, screens 202-a and 202-b are related to one another as being login pages, while screens 202-c to 202-f are related to one another as showing elements of the same list. In one example, the transition from screen 202-c to screen 202-d may be caused by the user's command to present the next part of the list. The commands that the user entered are shown between each pair of screens, showing how the user's input corresponds to new information. These correspondences may be identified to help automate the performance of certain operations.

These screens may be grouped by a clustering operation. For example the text of each respective screen may be compared to the previous and subsequent screens to determine a distance metric that characterizes the similarity between the screens. In one example, a Levenshtein distance metric may be used, which identifies a number of character edits that would be needed to transfer one text into the other. Other types of metrics may be used instead of the Levenshtein distance, such as other types of edit distance metrics, as appropriate.

When the distance between two consecutive screens is below a threshold value, the screens may be clustered together. When the distance between two consecutive screens is above the threshold value, they may be divided into separate clusters. These clusters form an initial association between screens, but they may be further enhanced by considering how similarities between consecutive screens change over time.

Figure 3:
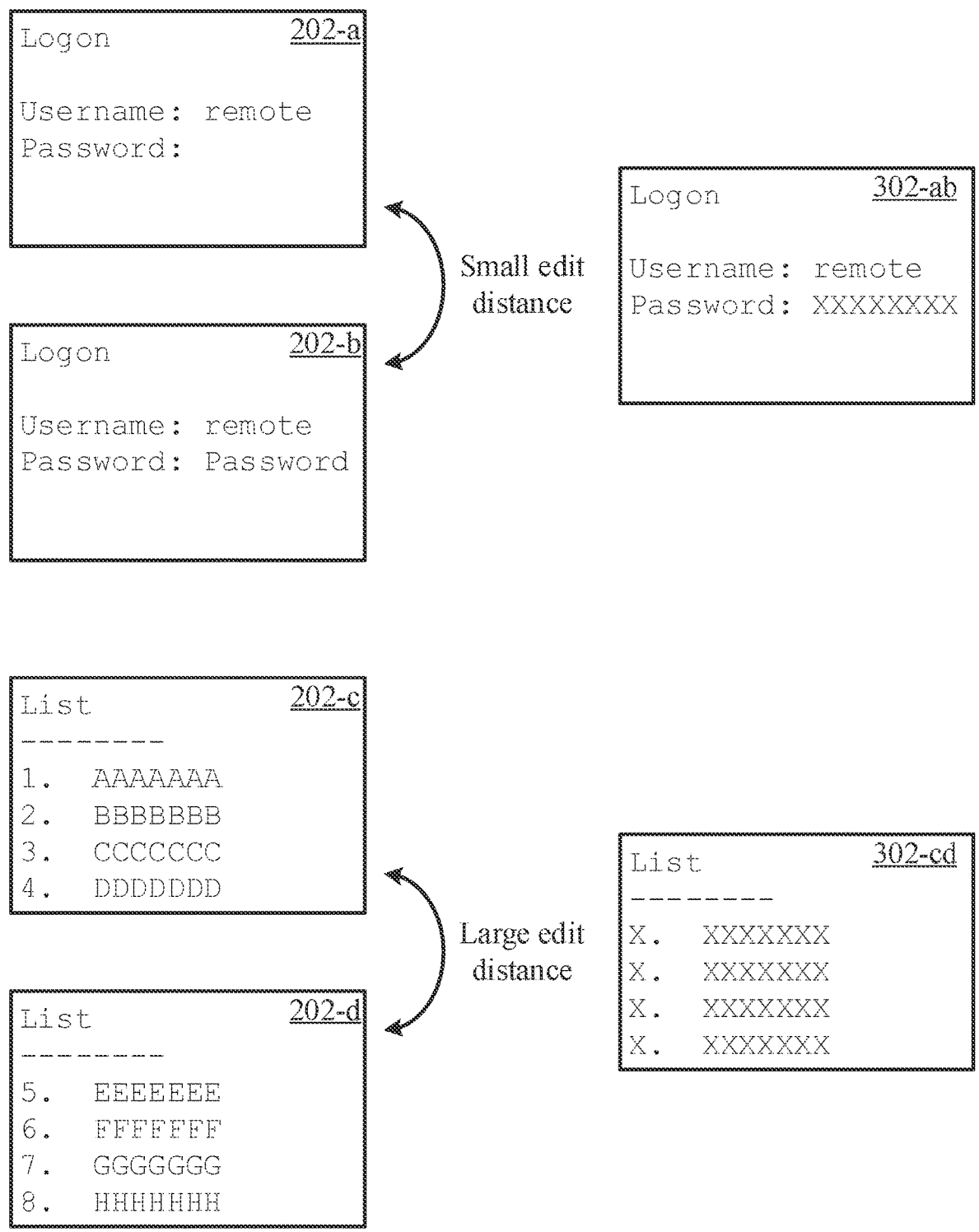
FIG. 3 is a diagram illustrating differences between consecutive screen outputs in an interaction between a client system and a remote system, in accordance with an embodiment of the present invention.

Referring now to FIG. 3, an exemplary comparison between consecutive screens is shown. In a first example, screens 202-a and 202-b are compared to one another. In this comparison, the majority of the text remains constant between the two screens, and the edit distance between the two screens is relatively small. In a second example, screens 202-c and 202-d are compared to one another. In this context, the majority of the text changes between the two screens, and so the edit distance between the two screens is relatively large. If the edit distance between 202-a and 202-b is lower than a distance threshold, they will be clustered together. If the edit distance between 202-c and 202-d is higher than the distance threshold, they will not be clustered together.

A human operator will readily see that the screens 202-c and 202-d may be related to a same page or function, even if the edit distance between them may be relatively large. Although most of the displayed information differs between these screens, the parts that remain constant provide sufficient context to identify them as pertaining to the same page or function. This can be represented by replacing the parts that differ between the screens with some character that is not present in either screen (e.g., 'X'). Thus, the differences between screens 202-a and 202-b are shown as difference 302-ab, while the differences between screens 202-c and 202-d are shown as difference 302-cd. Such a difference can be generated for each pair of consecutive screens 202.

Figure 4:
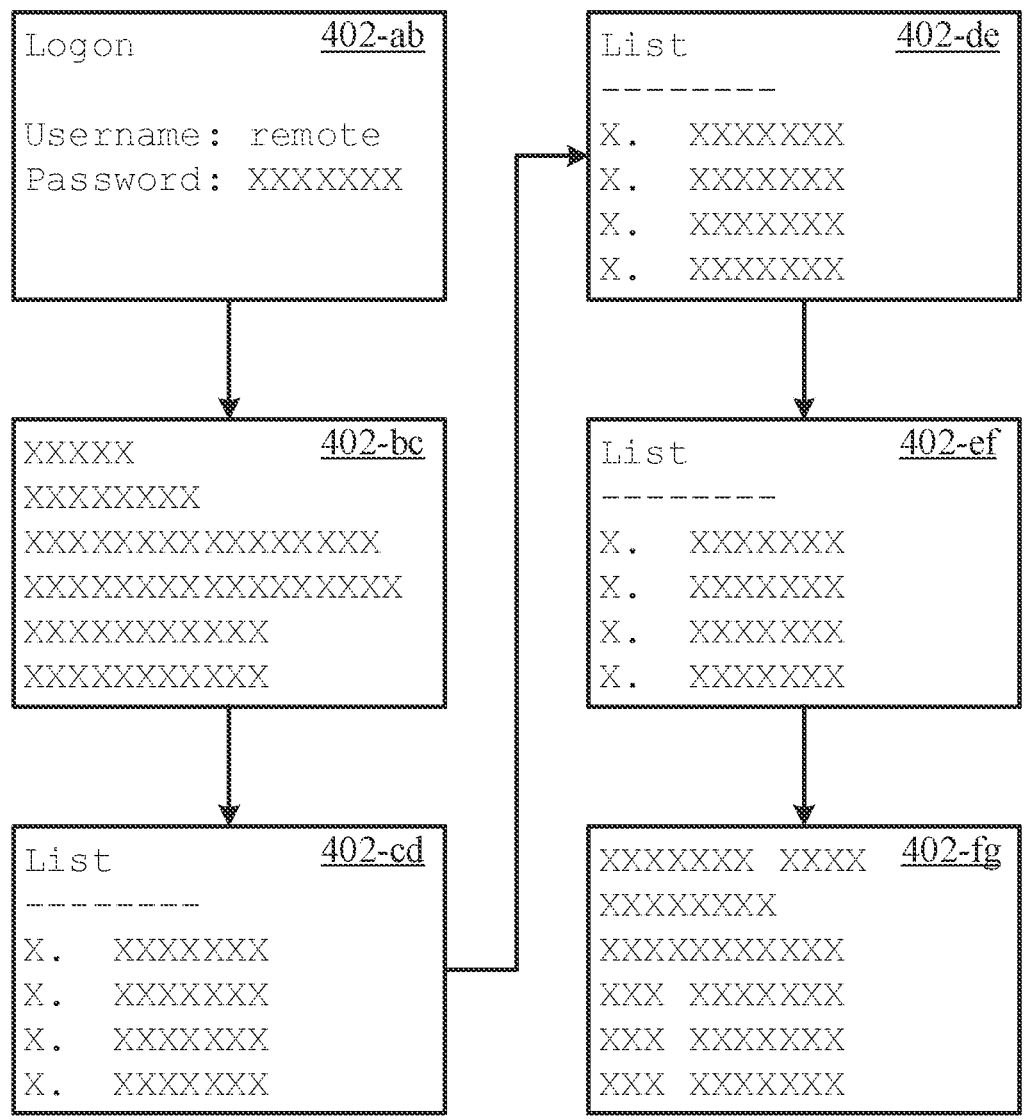
FIG. 4 is a diagram illustrating a series of screen differences in an interaction between a client system and a remote system, in accordance with an embodiment of the present invention.

Referring now to FIG. 4, a series of screen difference 402-ab to 402-fg is shown, with each screen difference 402 identifying parts of the corresponding consecutive screens 202 that are identical and parts that differ. Thus, screen difference 402-ab corresponds to screens 202-a and 202-b.

As used herein, the term "common parts" refers to text that is identical in two consecutive screens. Any character in a pair of consecutive screens 202 that differs is replaced by a special character, in this case the character 'X'. It should be understood that any appropriate character may be used, including characters that are not permitted by the communications protocol, as this processing is done at the client 102. Thus, the common parts of the screen differences 402 are shown as normal text, whereas the different parts are shown with the special character.

Figure 5:
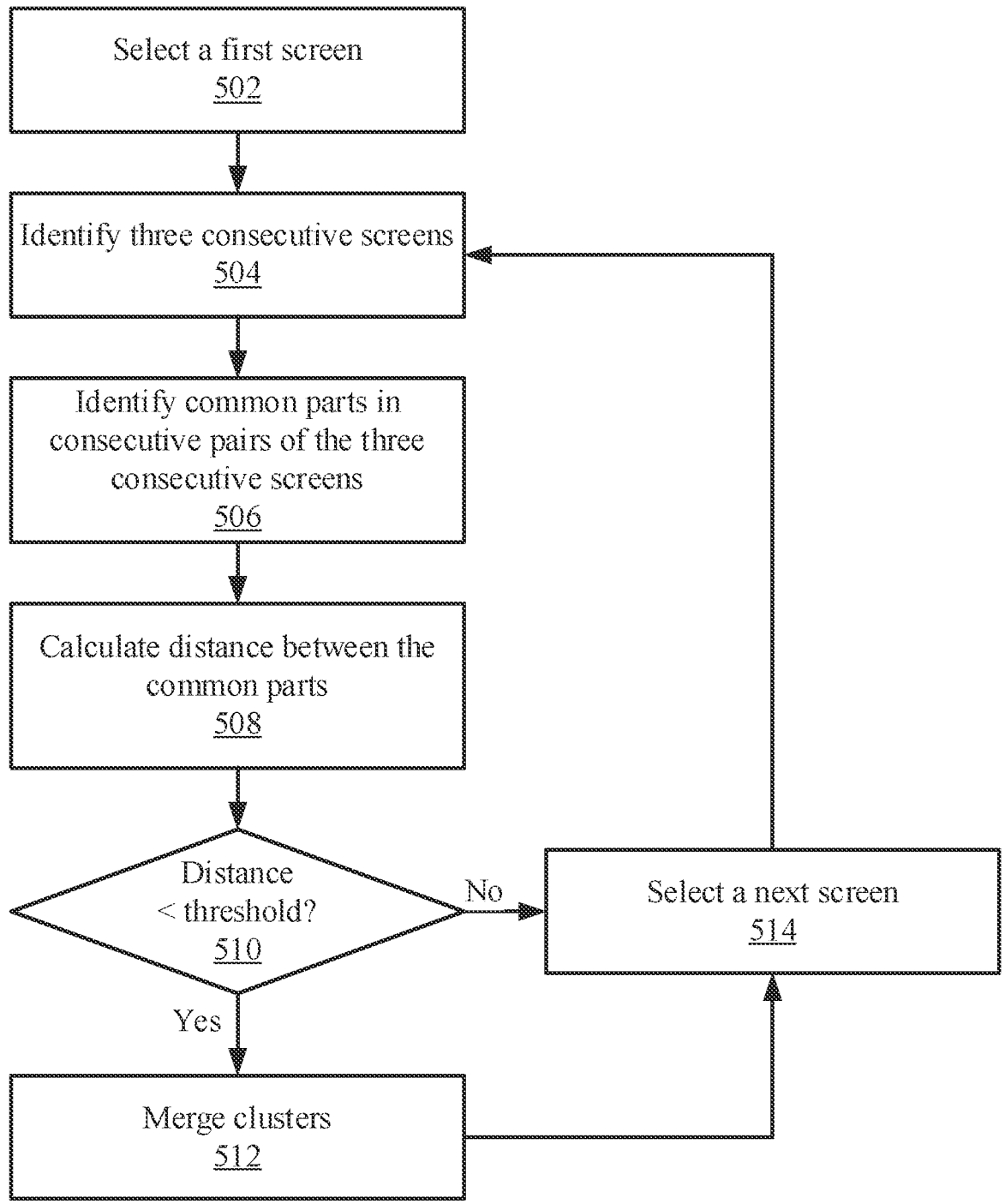
FIG. 5 is a block/flow diagram of a method of clustering screen outputs based on similarities between successive screen differences, in accordance with an embodiment of the present invention.

Referring now to FIG. 5, a method for further clustering related screens is shown. Block 502 selects a first screen in a series of consecutive screens. The series of consecutive screens may have already been clustered according to direct similarity (e.g., which would have clustered screens 202-*a* and 202*b* together). Following the example provided above, this would be screen 202-*a*. Block 504 then identifies three consecutive screens (e.g., 202-*a*, 202-*b*, and 202-*c*), starting with the selected screen 202-*a*.

Block 506 identifies common parts in consecutive pairs of the three consecutive screens. Thus, screen 202-*a* is compared with screen 202-*b* to generate screen difference 402-*ab* and screen 202-*b* is compared with screen 202-*c* to generate screen difference 402-*bc*. Block 508 then calculates a distance between the common parts of the screen differences. In this example, referring to FIG. 4, screen differences 402-*ab* and 402-*bc* have a large distance, having no shared text (as screen difference 402-*bc* does not include any parts beyond the Xs).

Block 510 compares the distance to a threshold value. If the distance is greater than the threshold, as in this example, block 514 selects a next screen in the sequence (e.g., screen 202-*b*) and processing returns to block 504, where a further three consecutive screens (202-*b*, 202-*c*, and 202-*d*) are selected. Processing repeats, generating screen differences 402-*bc* and 402-*cd*. The common parts of these screen differences also have a large distance between them, so a next screen 202-*c* is selected and processing repeats.

In this iteration, the three consecutive screens 202-*c*, 202-*d*, and 202-*e* generate screen differences 402-*cd* and 402-*de*. As can be seen in FIG. 4, there is substantial shared text between screen difference 402-*cd* and screen difference 402-*de*. Thus, the distance calculated in block 508 for the common parts of 402-*cd* and 402-*de* may be below the distance threshold. In this event, the clusters of the three consecutive screens are merged together in block 512. Block 514 then selects a next screen 202-*d* and processing returns to block 504.

In this iteration, the three consecutive screens 202-*d*, 202-*e*, and 202-*f* generate screen differences 402-*de* and 402-*ef*. As in the previous iteration, the common parts of these screen differences may be below the threshold in block 510, and so the screens may be clustered together. Because screens 202-*c*, 202-*d*, and 202-*e* were already clustered together in the previous iteration, they are now all clustered together with screen 202-*f*. Thus pre-existing clusters, whether from a previous iteration or from a separate clustering process, may have new screens added to them.

This process may continue until all of the screens in a sequence have been evaluated. The clusters may represent pages of a program at the mainframe 104, with various different screens corresponding to a single page. Correspondences between user actions and the pages can be identified to assist in automating interactions with the mainframe 104.

In the example above, block 512 merges all three consecutive images at once. In another embodiment, block 512 may merge only the first two of the three consecutive images. For example, following the above example, an iteration may cluster screens 202-*c* and 202-*d* together, and a next iteration may cluster screens 202-*d* and 202-*e* together, thereby adding 202-*e* to the cluster of 202-*c* and 202-*d*.

Figure 6:
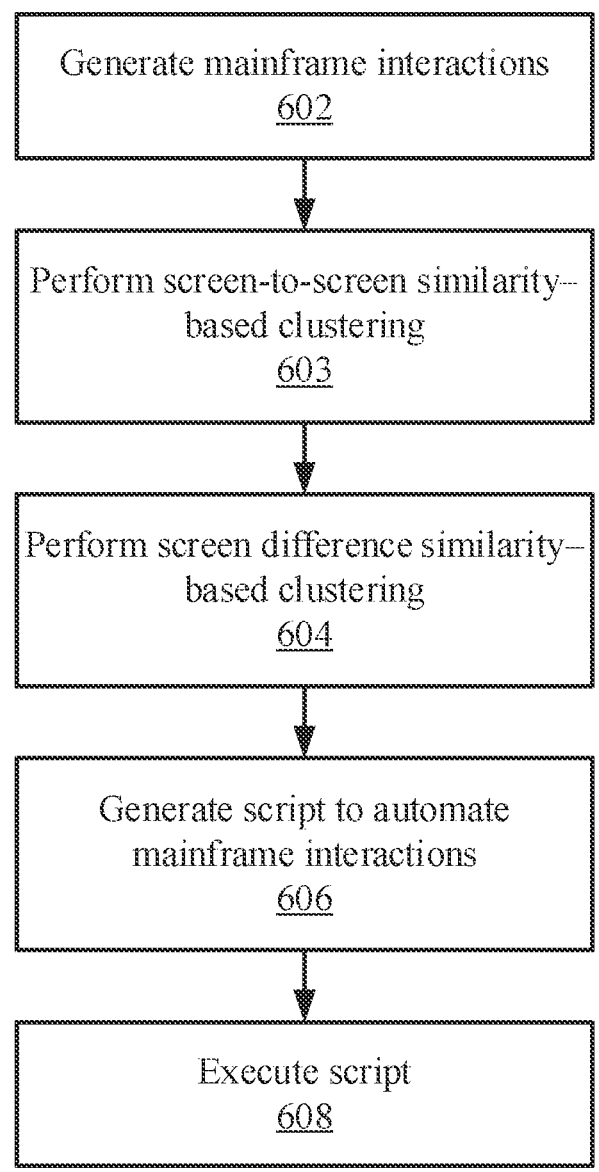
FIG. 6 is a block/flow diagram of a method of automating interactions with a remote computer system using screen difference similarity based clustering, in accordance with an embodiment of the present invention.

Referring now to FIG. 6, a method for automating interactions with a mainframe 104 is shown. Block 602 generates interactions with the mainframe 104, which may include issuing commands from a client 102 to the mainframe 104 and recording screens that are output by the mainframe 104. In the context of a single-page application embodiment, these interactions may include issuing commands to the application and recording outputs of the application.

Block 603 performs an initial clustering that is based on screen-to-screen similarity (e.g., clustering consecutive screens that have a below-threshold distance from one another). Block 604 further clusters related screens together, for example using the clustering of FIG. 5 to cluster screens based on similarities between the common parts of consecutive pairs of consecutive screens. These clustering steps identify pages within the mainframe 104 or application that, for example, share a common context or function.

Block 606 then generates a script to automate interactions with the mainframe 104 or program. Block 608 executes the script, with actions being performed at the mainframe 104 or program without further human intervention.

Figure 7:
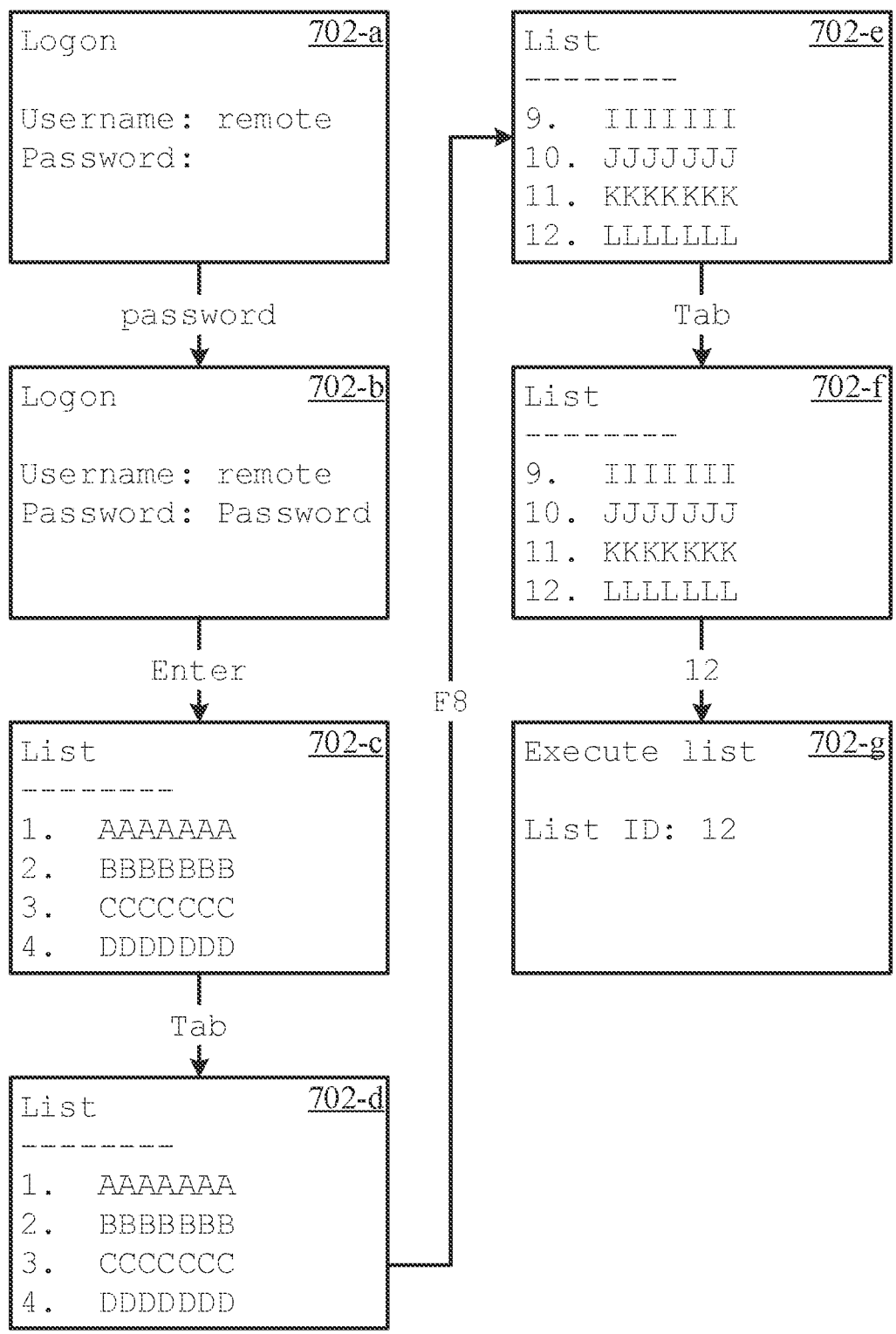
FIG. 7 is a diagram illustrating a series of exemplary screen outputs in an interaction between a client system and a remote system, in accordance with an embodiment of the present invention.

Referring now to FIG. 7, an alternative example with a series of screens 702-*a* to 702-*g* is shown. In some cases, an input may not change the contents of a screen, resulting in a screen output that is identical to a previous screen output. As above, starting at screen 702-*a*, each subsequent screen is provided in response to some input by a user. So, for example, the transition from screen 702-*b* to screen 202-*c* may be caused by the user's submission of a password. The commands that the user entered are shown between each pair of screens, showing how the user's input corresponds to new information. These correspondences may be identified to help automate the performance of certain operations.

Notably, screens 702-*c* and 702-*d* are identical to one another, and screens 702-*e* and 702-*f* are identical to one another, because the user's command (in this case, the "tab" key) does not change the contents of the screen. For example, navigation commands may change the position at which a user enters an input in the screen without changing the substantive contents of the screen.

Figure 8:
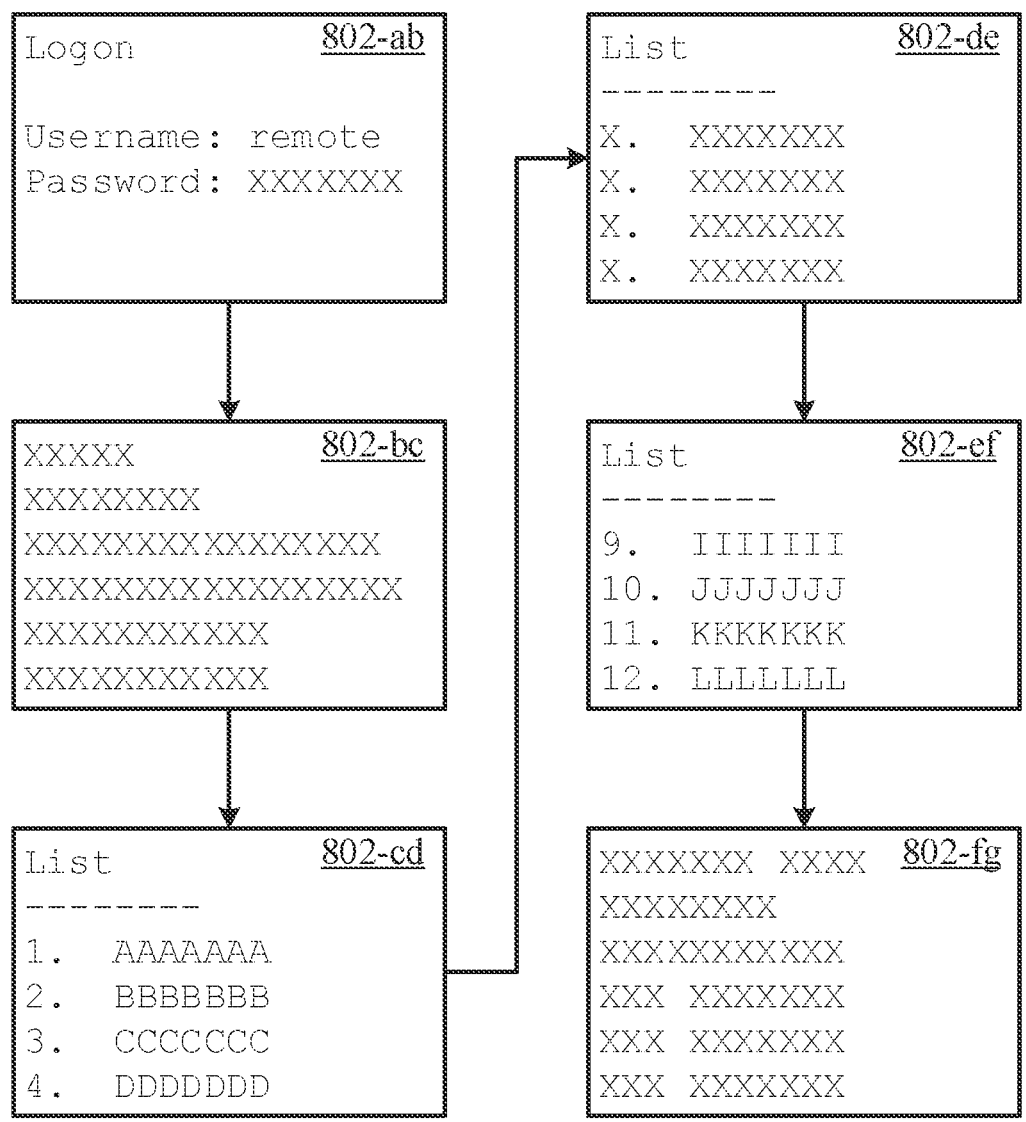
FIG. 8 is a diagram illustrating a series of screen differences in an interaction between a client system and a remote system, in accordance with an embodiment of the present invention.

Referring now to FIG. 8, an exemplary comparison between consecutive screens is shown. A series of screen differences 802-*ab* to 802-*fg* is shown, with each screen difference 802 identifying parts of the corresponding consecutive screens 702 that are identical and parts that differ. Thus, screen difference 802-*ab* corresponds to screens 702-*a* and 702-*b*. As above, the common parts of the screen differences 802 are shown as normal text, whereas the different parts are shown with the special character.

Making further reference to FIG. 5, as applied to the example of FIGS. 7 and 8, the three consecutive screens 702-*c*, 702-*d*, and 702-*e* generate screen differences 802-*cd* and 802-*de*. There is substantial shared text between screen difference 802-*cd* and screen difference 802-*de*. Thus, the distance calculated in block 508 for the common parts of 802-*cd* and 802-*de* may be below the distance threshold. Notably, the threshold may be set to match screens with any appropriate degree of similarity, and in this example is set to identify 802-*cd* and 802-*de* as being similar. In this event, the clusters of the three consecutive screens are merged together in block 512. That is, assume that the cluster 1 has 702-*c* and 702-*d*, and the cluster 2 has 702-*e* and 702-*d*, all screens in cluster 2 may be merged into cluster 1. Then cluster 1 will have 702-*c*, -*d*, -*e*. Block 514 then selects a next screen 702-*d* and processing returns to block 504.

Screen 702-*f* will similarly be added to this cluster. In this iteration, the three consecutive screens 702-*d*, 702-*e*, and 702-*f* are in the same cluster, So Block 514 then selects a next screen 702-*e* and processing returns to block 504.

In this iteration, the three consecutive screens 702-*e*, 702-*f*, and 702-*g* generate screen differences 802-*ef* and 802-*fg*. As in the previous iteration, the common parts of these screen differences may be above the threshold in block 510, So Block 514 then selects a next screen 702-*e* and processing returns to block 504.

Figure 9:
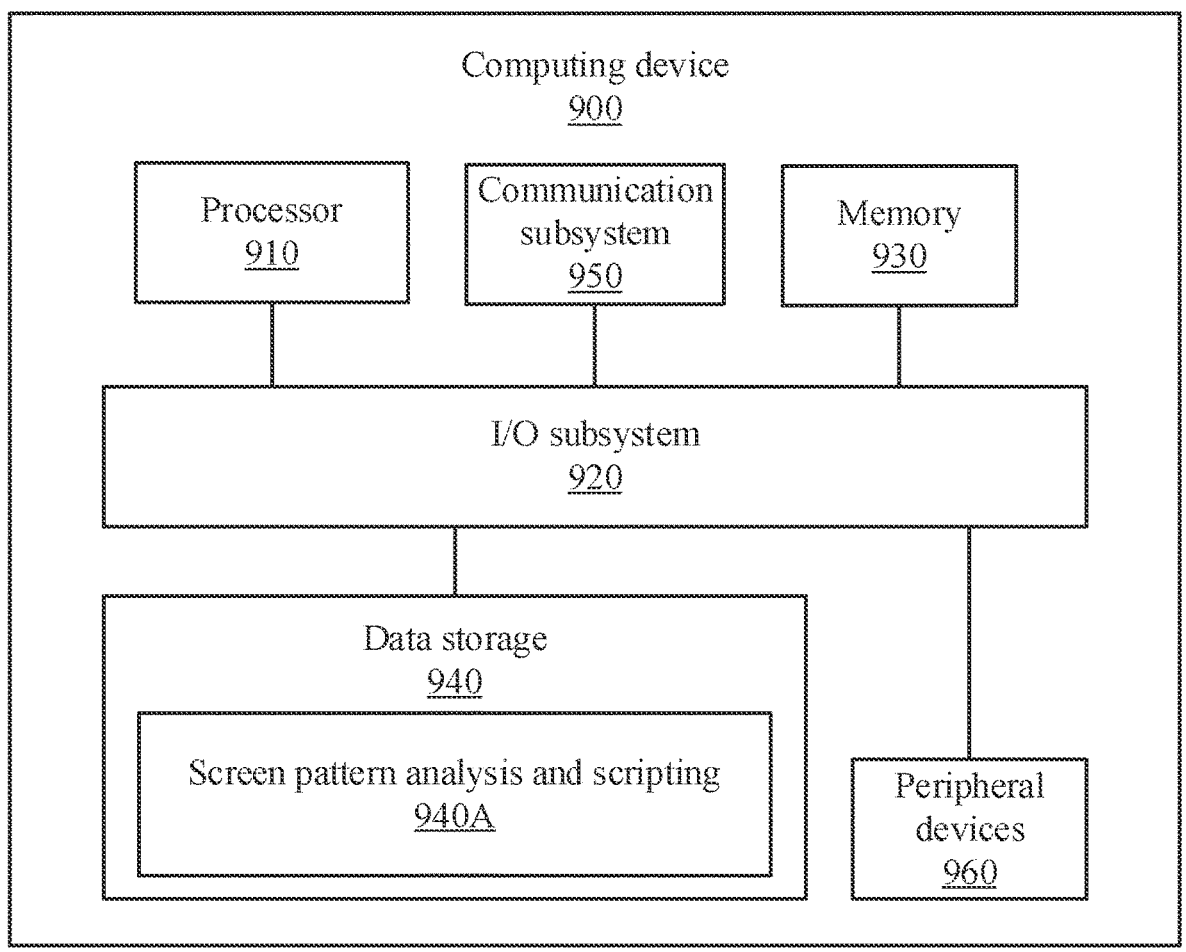
FIG. 9 is a block diagram of a computer system that performs screen pattern analysis and scripting, in accordance with an embodiment of the present invention.

FIG. 9 is a block diagram showing an exemplary computing device 900, in accordance with an embodiment of the present invention. The computing device 900 is configured to perform screen pattern analysis and scripting.

The computing device 900 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 900 may be embodied as a one or more compute sleds, memory sleds, or other racks, sleds, computing chassis, or other components of a physically disaggregated computing device.

As shown in FIG. 9, the computing device 900 illustratively includes the processor 910, an input/output subsystem 920, a memory 930, a data storage device 940, and a communication subsystem 950, and/or other components and devices commonly found in a server or similar computing device. The computing device 900 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 930, or portions thereof, may be incorporated in the processor 910 in some embodiments.

The processor 910 may be embodied as any type of processor capable of performing the functions described herein. The processor 910 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 930 may be embodied as any type of volatile or non-volatile memory or data storage capable of performing the functions described herein. In operation, the memory 930 may store various data and software used during operation of the computing device 900, such as operating systems, applications, programs, libraries, and drivers. The memory 930 is communicatively coupled to the processor 910 via the I/O subsystem 920, which may be embodied as circuitry and/or components to facilitate input/output operations with the processor 910, the memory 930, and other components of the computing device 900. For example, the I/O subsystem 920 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.), and/or other components and subsystems to facilitate the input/output operations. In some embodiments, the I/O subsystem 920 may form a portion of a system-on-a-chip (SOC) and be incorporated, along with the processor 910, the memory 930, and other components of the computing device 900, on a single integrated circuit chip.

The data storage device 940 may be embodied as any type of device or devices configured for short-term or long-term storage of data such as, for example, memory devices and circuits, memory cards, hard disk drives, solid state drives, or other data storage devices. The data storage device 940 can store program code 940A for screen pattern analysis and scripting. The communication subsystem 950 of the computing device 900 may be embodied as any network interface controller or other communication circuit, device, or collection thereof, capable of enabling communications between the computing device 900 and other remote devices over a network. The communication subsystem 950 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 900 may also include one or more peripheral devices 960. The peripheral devices 960 may include any number of additional input/output devices, interface devices, and/or other peripheral devices. For example, in some embodiments, the peripheral devices 960 may include a display, touch screen, graphics circuitry, keyboard, mouse, speaker system, microphone, network interface, and/or other input/output devices, interface devices, and/or peripheral devices.

Of course, the computing device 900 may also include other elements (not shown), as readily contemplated by one of skill in the art, as well as omit certain elements. For example, various other sensors, input devices, and/or output devices can be included in computing device 900, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 900 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 10:
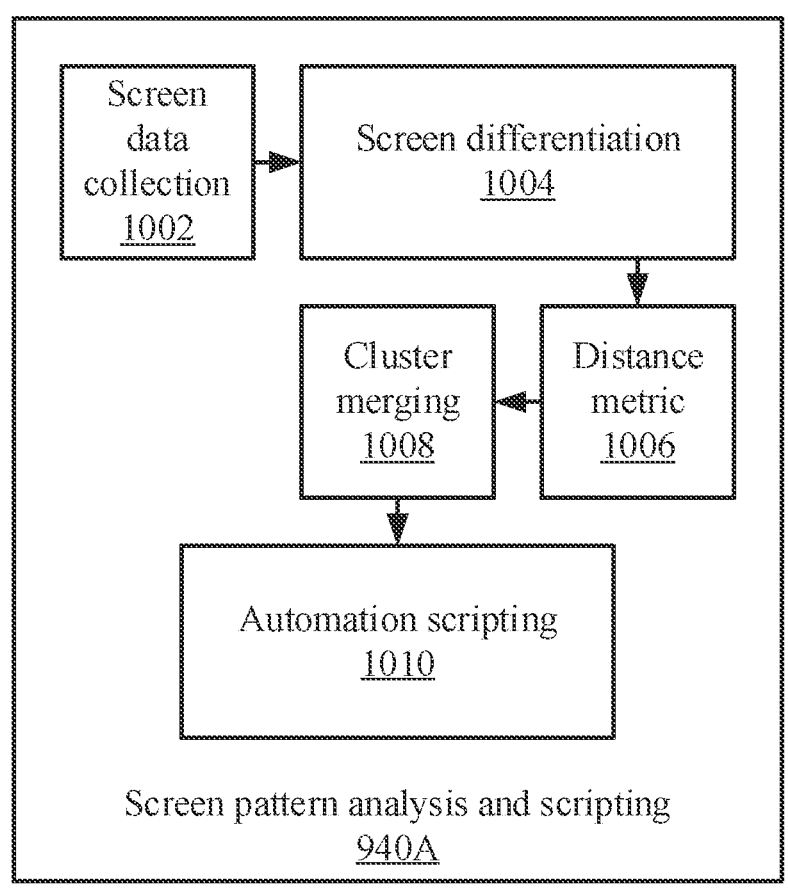
FIG. 10 is a block diagram of a computer program for screen pattern analysis and scripting, in accordance with an embodiment of the present invention.

Referring now to FIG. 10, additional detail on the screen pattern analysis and scripting 940A is shown. Screen data collection 1002 records interactions between a client 102 and a mainframe 104, for example including recording the screen data 202 sent by the mainframe 104 to the client 102 and any commands sent by the client 102 to the mainframe 104.

Screen differentiation 1004 identifies differences between consecutive screens, for example as shown in FIG. 4, replacing differing characters with a special character to create screen differences 402. A distance metric 1006 is used to identify, for example, an edit distance between successive screen differences 402, which cluster merging 1008 uses to group screens into clusters. Automation scripting 1010 uses the screen clusters to help with scripting for automating interactions, for example identifying when multiple screens relate to a single page by the fact that they are in the same cluster.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of page transition detection using screen operation history (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented automation method, comprising:
   identifying first common parts of a first consecutive pair of consecutive screen outputs by comparing the first consecutive pair of consecutive screen outputs;
   identifying second common parts of a second consecutive pair of consecutive screen outputs by comparing the second pair of consecutive screen outputs;
   comparing the first common parts with the second common parts to determine a distance;
   clustering the screen outputs of the first consecutive pair and the second consecutive pair together responsive to a determination that the distance is lower than a threshold distance value; and
   automating interactions with a remote computer system by generating a script based on the clustered consecutive screen outputs and executing the script.

2. The method of claim 1, wherein the consecutive screen outputs include three consecutive screen outputs.

3. The method of claim 2, wherein clustering includes clustering together a first and second screen output of the three consecutive screen outputs.

4. The method of claim 3, wherein clustering further includes clustering a third screen output of the three consecutive screen outputs with the first and second screen output.

5. The method of claim 1, wherein identifying common parts includes generating a respective screen difference for each of the consecutive pairs that includes text that is common to the pair of consecutive screen outputs and replaces all other text of the pair of consecutive screen outputs with a special character.

6. The method of claim 5, further comprising determining the distance between the common parts of the consecutive pairs by comparing text of the corresponding screen differences other than the special character.

7. The method of claim 1, further comprising iterating the identifying and clustering based on new screen outputs in a plurality of consecutive screen outputs until all of the plurality of consecutive screen outputs have been processed.

8. The method of claim 1, further comprising generating the consecutive screen outputs by issuing commands to a remote computer system that generates outputs one full screen at a time.

9. The method of claim 1, further comprising recording the screen outputs from communications between a client and the remote computer system.

10. The method of claim 1, wherein the screen outputs are transmitted with the IBM® 3270 terminal protocol.

11. A computer program product for automation, the computer program product comprising a computer readable storage medium having program instructions embodied therewith, the program instructions being executable by a hardware processor to cause the hardware processor to:
identify first common parts of a first consecutive pair of consecutive screen outputs by comparing the first consecutive pair of consecutive screen outputs;
identify second common parts of a second consecutive pair of consecutive screen outputs by comparing the second pair of consecutive screen outputs;
compare the first common parts with the second common parts to determine a distance;
cluster the screen outputs of the first consecutive pair and the second consecutive pair together responsive to a, determination that the distance is lower than a threshold distance value; and
automate interactions with a remote computer system by generating a script based on the clustered consecutive screen outputs and executing the script.

12. The computer program product of claim 11, wherein the consecutive screen outputs include three consecutive screen outputs.

13. The computer program product of claim 12, wherein the computer program further causes the hardware processor to cluster together a first and second screen output of the three consecutive screen outputs.

14. The computer program product of claim 13, wherein the computer program further causes the hardware processor to cluster a third screen output of the three consecutive screen outputs with the first and second screen output.

15. The computer program product of claim 11, wherein the computer program further causes the hardware processor to generate a respective screen difference for each of the consecutive pairs that includes text that is common to the pair of consecutive screen outputs and replaces all other text of the pair of consecutive screen outputs with a special character.

16. The computer program product of claim 15, wherein the computer program further causes the hardware processor to determine the distance between the common parts of the consecutive pairs by comparing text of the corresponding screen differences other than the special character.

17. The computer program product of claim 11, wherein the computer program further causes the hardware processor to iterate the identification and clustering based on new screen outputs in a plurality of consecutive screen outputs until all of the plurality of consecutive screen outputs have been processed.

18. The computer program product of claim 11, wherein the computer program further causes the hardware processor to generate the consecutive screen outputs by issuing commands to a remote computer system that generates outputs one full screen at a time.

19. The computer program product of claim 11, wherein the computer program further causes the hardware processor to record the screen outputs from communications between a client and the remote computer system.

20. An automation system, comprising:
a hardware processor; and
a memory that stores a computer program, which, when executed by the hardware processor, causes the hardware processor to:
identify first common parts of a first consecutive pair of consecutive screen outputs by comparing the first consecutive pair of consecutive screen outputs;
identify second common parts of a second consecutive pair of consecutive screen outputs by comparing the second pair of consecutive screen outputs;
compare the first common parts with the second common parts to determine a distance;
cluster the screen outputs of the first consecutive pair and the second consecutive pair together responsive to a determination that the distance is lower than a threshold distance value; and
automate interactions with a remote computer system by generating a script based on the clustered consecutive screen outputs and executing the script.

* * * * *